(12) United States Patent
Ashcroft et al.

(10) Patent No.: US 8,189,969 B2
(45) Date of Patent: May 29, 2012

(54) TRUSTWORTHY OPTOMECHANICAL SWITCH

(75) Inventors: Charles Anthony Ashcroft, Latham (AU); Colin Robert Law, Jerrabomberra (AU)

(73) Assignee: Raytheon Australia Pty. Ltd., Canberra Airport ACT (AU)

( * ) Notice: Subject to any disclaimer, the term of this patent is extended or adjusted under 35 U.S.C. 154(b) by 665 days.

(21) Appl. No.: 11/988,637

(22) PCT Filed: Jul. 11, 2006

(86) PCT No.: PCT/AU2006/000978
§ 371 (c)(1),
(2), (4) Date: Jun. 1, 2009

(87) PCT Pub. No.: WO2007/009157
PCT Pub. Date: Jan. 25, 2007

(65) Prior Publication Data
US 2009/0297145 A1  Dec. 3, 2009

(30) Foreign Application Priority Data
Jul. 15, 2005 (AU) ................................ 2005903770

(51) Int. Cl.
*G02B 6/26* (2006.01)
(52) U.S. Cl. ......................................................... 385/16
(58) Field of Classification Search .................... 385/16, 385/20–23
See application file for complete search history.

(56) References Cited

U.S. PATENT DOCUMENTS

| | | | | |
|---|---|---|---|---|
| 4,378,144 | A * | 3/1983 | Duck et al. ...................... | 385/16 |
| 4,753,501 | A * | 6/1988 | Battle ............................. | 385/22 |
| 5,351,065 | A * | 9/1994 | Killinger ....................... | 345/109 |
| 6,335,993 | B1 * | 1/2002 | Takahashi ...................... | 385/25 |
| 6,678,434 | B1 * | 1/2004 | Goodman et al. .............. | 385/16 |
| 6,778,729 | B1 * | 8/2004 | Guy ................................ | 385/22 |
| 6,856,720 | B2 * | 2/2005 | Baugh ............................ | 385/22 |

* cited by examiner

*Primary Examiner* — Charlie Peng

(57) ABSTRACT

A switch having two apertured plates one of which is movable relative to the other to occupy spaced switch positions, the apertures being arranged in the plates so that in each switch position two or more pairs of apertures are aligned and all others are masked, wherein light transmitted through a selected one of the two or more aligned aperture pairs in a particular switch position is visible through an external switch position indicating window to thereby provide an unambiguous indication that the movable plate is positively registered in the particular switch position.

13 Claims, 4 Drawing Sheets

TRUSTWORTHY OPTOMECHANICAL SWITCH

FIELD OF THE INVENTION

The present invention relates to a trustworthy optomechanical switch.

BACKGROUND OF THE INVENTION

A "trustworthy switch" is one which is capable of providing an unambiguous indication that it is in a particular switch position. Based on its unambiguous indication of switch position, the trustworthy switch can be used to selectively switch between nodes of a system with a high degree of confidence that spurious switching or crosstalk will be prevented. Trustworthy switches are critical in information, communication and control systems where positive, unambiguous switching is required for efficacy, security and safety.

A need exists for a simple, generic optomechanical switch capable of providing unambiguous indications of its switch positions.

SUMMARY OF THE INVENTION

According to the present invention, there is provided a switch having two apertured plates one of which is movable relative to the other to occupy spaced switch positions, the apertures being arranged in the plates so that in each switch position two or more pairs of apertures are aligned and all others are masked, wherein light transmitted through a selected one of the two or more aligned aperture pairs in a particular switch position is visible through an external switch position indicating window to thereby provide an unambiguous indication that the movable plate is positively registered in the particular switch position.

Light can be transmitted to and from aligned aperture pairs via optical fibres.

The other aligned aperture pairs in the particular switch position can respectively transmit light among optically-interfaced nodes of a system. The switch can be enclosed in a cabinet having a frame with a stack of drawers each housing a node of the system. The drawers can be electromagnetically shielded from one another to prevent or minimise crosstalk between the nodes. The system can be selected from an information system, a communication system, a control system, and combinations thereof. The system can include more than one switch.

The switch can further include a manual position selector operatively connected to a servo motor to electromechanically actuate the movable plate to selectively occupy the switch positions. The manual position selector can have manually selectable positions corresponding to the internal switch positions and the external switch position indicating windows.

Three or more pairs of apertures can be aligned in each switch position, wherein light transmitted through a second selected aligned aperture pair in a particular switch position provides a feedback control signal to the servo motor that the movable plate is positively registered in the particular switch position.

Four or more pairs of apertures can be aligned in each switch position, wherein light transmitted through a third selected aligned aperture pair in a particular switch position allows monitoring or logging of the particular switch position.

The apertured plates can be rectilinear or circular, and the movement of one relative to the other can be linear movement or rotary movement.

The apertured plates can be disposed closely adjacent each other whereby their close adjacency prevents optical leakage from aligned aperture pairs. The switch can be enclosed in a security housing which prevents or resists tampering with its optomechanical components.

BRIEF DESCRIPTION OF THE DRAWINGS

The present invention will now be described by way of non-limiting example only with reference to the accompanying drawings in which.

DETAILED DESCRIPTION

Figure 1:
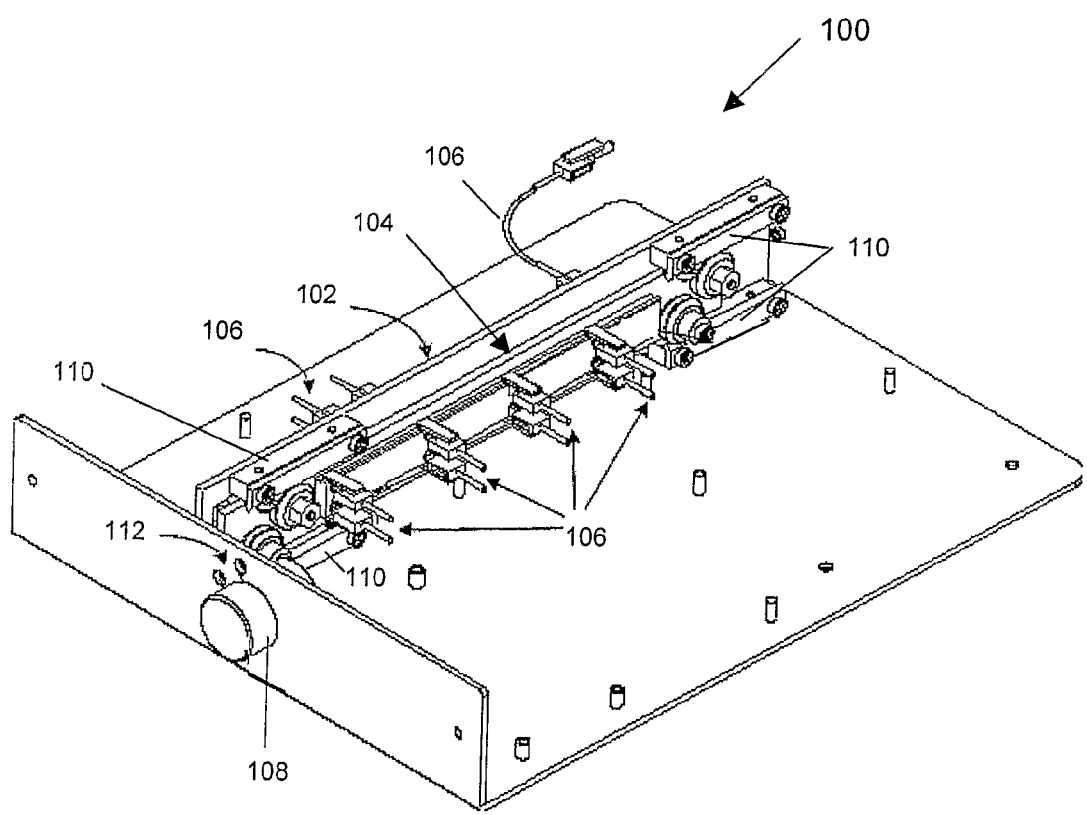
FIG. 1 is a partial perspective view of a trustworthy optomechanical switch of the present invention.

FIG. 1 illustrates an optomechanical switch 100 having two closely, adjacent apertured plates 102, 104. Plate 104 is slidably movable relative to the other plate 102 to occupy four spaced switch positions A, B, C, D. Light is transmitted to and from the apertures of the plates 102, 104 via optical fibres 106. The switch 100 further includes a manual position selector 108 operatively connected to a servo motor (not shown) to electromechanically actuate the movable plate 104 to selectively occupy the switch positions A, B, C, D. The movable plate is positively guided between the switch positions A, B, C, D by guide rails 110. The manual position selector 108 has four manually selectable positions corresponding to the four internal switch positions A, B, C, D and four external switch position indicating windows 112.

Figure 2:
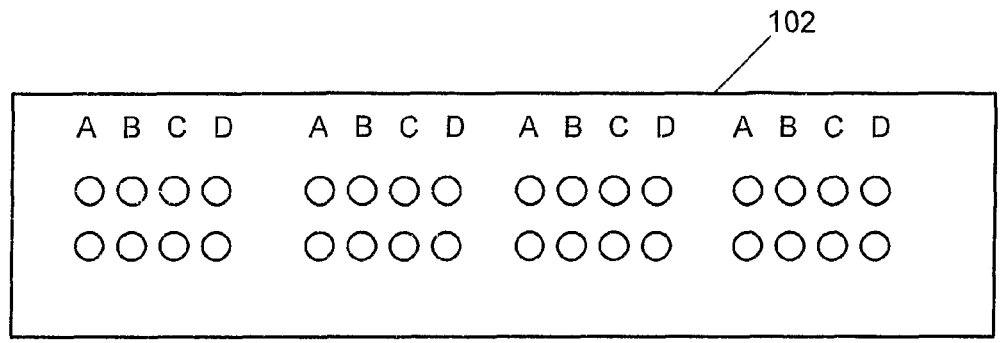
FIGS. 2 to 4 are schematic views of fixed and movable elements of the trustworthy switch.
Figure 3:
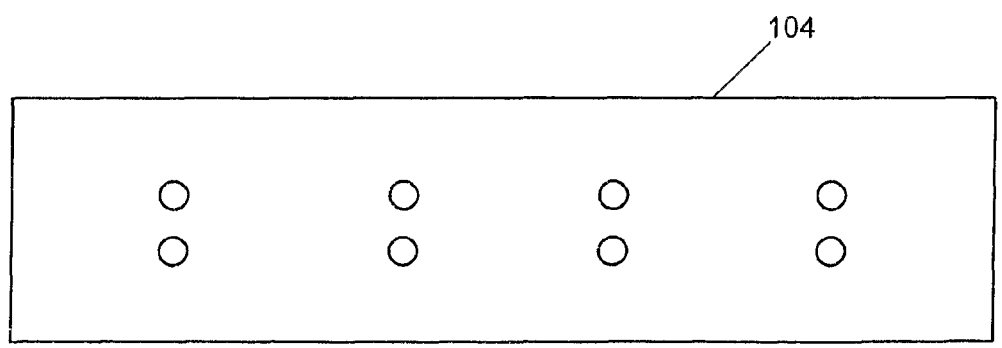
Figure 4:
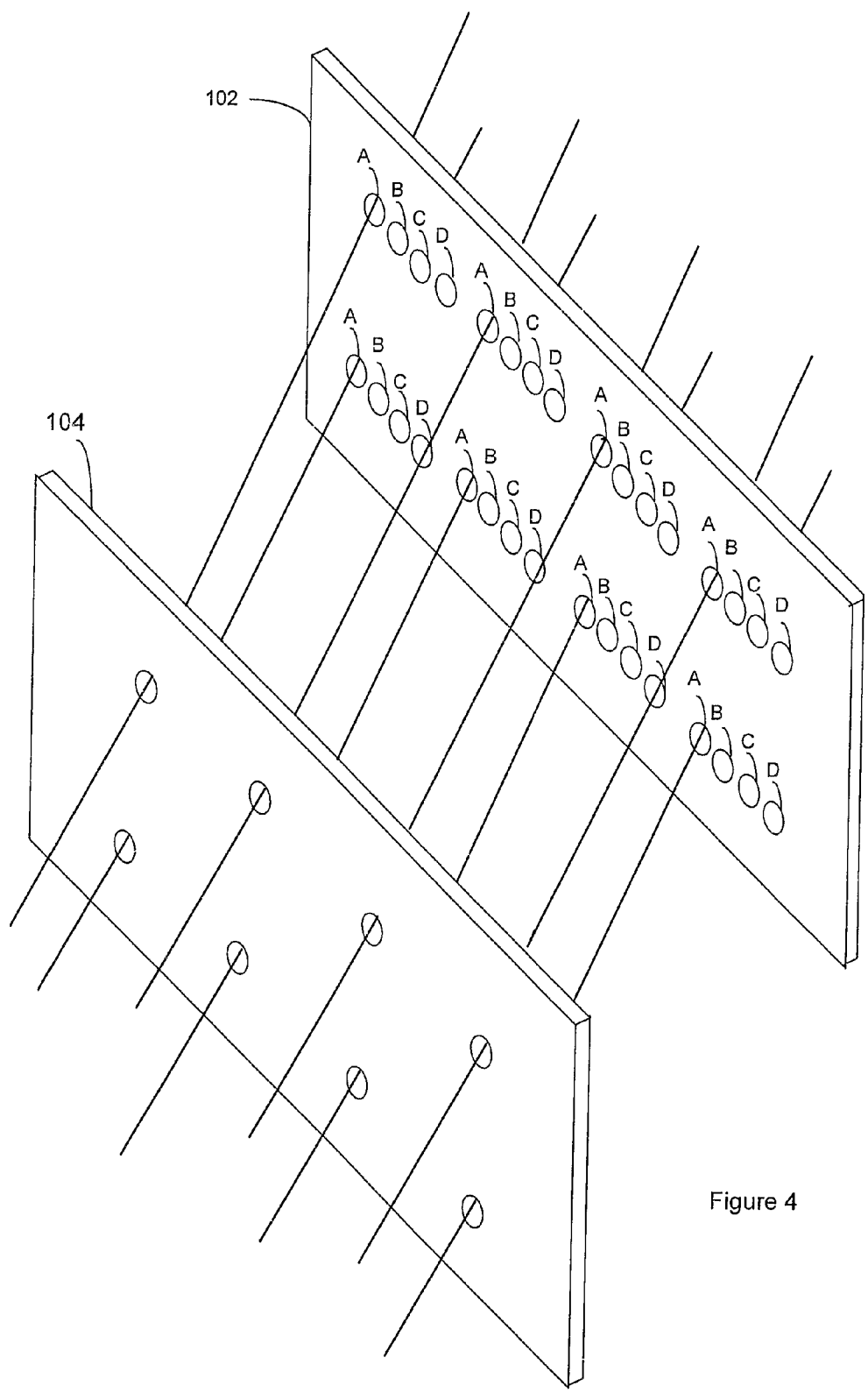

Referring to FIGS. 2 to 4, the apertures are arranged in the plates 102, 104 so that in each switch position A, B, C, D eight pairs of apertures are aligned and all others are masked. As illustrated in FIG. 2, each switch position A, B, C, D is defined by four staggered, repeating pairs of upper and lower apertures in the fixed plate 102. In a particular switch position, for example switch position A illustrated in FIG. 4, light from a light source (not shown) is transmitted through a selected pair of the eight aligned aperture pairs and to the corresponding switch position indicating window 112 via an optical fibre 106 to thereby provide an unambiguous visible indication that the movable plate 104 is positively registered in the particular switch position. Light is respectively transmitted through another two aligned aperture pairs to provide feedback to the servo motor that the movable plate 104 is positively registered in the particular switch position, and to allow monitoring or logging of the particular switch position. The remaining five of the eight aligned aperture pairs in the particular switch position respectively transmit light among optically-interfaced nodes of a system (not shown) via optical fibres 106. The apertured plates 102, 104 can be disposed closely adjacent each other inside a security housing (not shown). The close adjacency of the apertured plates 102, 104 prevents optical leakage from aligned aperture pairs, while the security housing prevents or resists tampering with the optomechanical components of the switch 100.

Figure 6:
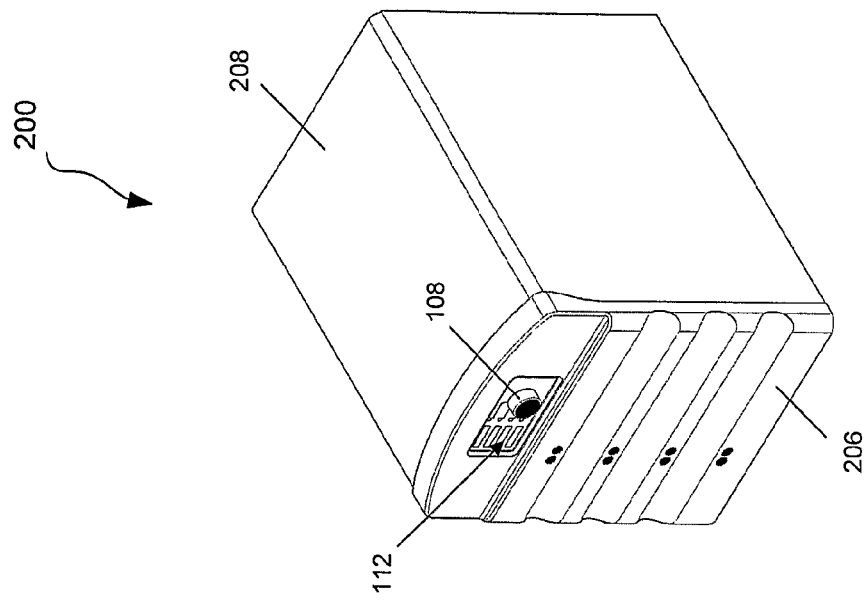
FIGS. 5 and 6 are respective exploded and assembled views of the trustworthy switch implemented in a multiple processor switch cabinet.
Figure 5:
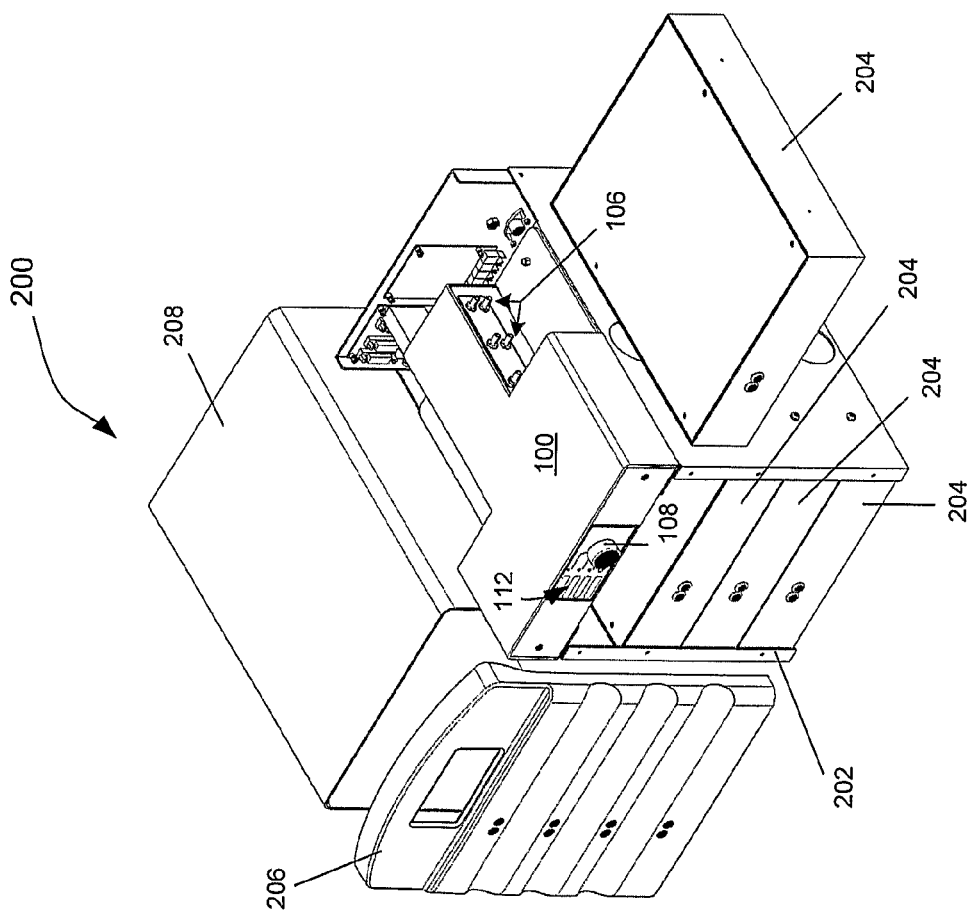

Referring to FIGS. 5 and 6, the switch 100 can be enclosed in a cabinet 200 having a frame 202 with a stack of drawers 204 each housing a node of the system. The drawers 204 can be electromagnetically shielded from one another to prevent or minimise crosstalk between the nodes. The switch 100 is optically interfaced to the nodes via optical fibres 106 received in the shielded drawers 204 without causing appreciable electromagnetic leakage therefrom. The optical fibres 106 are reticulated via a vertical space at the back of the cabinet 200 along with the power supply (not shown) for the components. The frame 202 is enclosed by a front panel 206 and a cover 208 having top and side walls.

The switch 100 and the cabinet 200 can be implemented in a system where positive, unambiguous switching between system nodes is critical for efficacy, security or safety. The system can be selected from an information system, a communication system, a control system, and combinations thereof. The system can include more than one switch 100 or more than one cabinet 200. For example, the switch 100 and the cabinet 200 can be implemented in a multi-processor information system to positively and unambiguously switch between processor-level nodes having mutually different permission levels or security classifications.

Embodiments of the present invention provide a simple, generic trustworthy optomechanical switch that is capable of providing an unambiguous indication of its switching position. Such a switch can be advantageously used in any and all conventional information, communication and control systems where positive, unambiguous switching is critical for efficacy, security and safety.

Obviously, many other modifications and variations of the present invention are possible in light of the above description. For example, the apertured plates are not limited to rectilinear plates having linear relative movement, but can be alternatively implemented as circular plates wherein the movement of one relative to the other is rotary movement. It is to be understood, therefore, that the invention is not limited in its application to the details of construction and arrangement of parts specifically described or illustrated, and that within the scope of the appended claims, it may be practised otherwise than as specifically described or illustrated.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A switch having two plates, each plate having one or more apertures, one is plate being movable relative to the other plate to cause the plates to occupy spaced switch positions, the apertures being arranged in the plates so that in each switch position, two or more pairs of apertures are aligned and all others are masked by one of the two plates, each aligned aperture pair comprising an aperture in each respective plate, and wherein light transmitted through a selected one of the two or more aligned aperture pairs in a particular switch position is visible through an external switch position indicating window to thereby provide an unambiguous indication that the movable plate is positively registered in the particular switch position.

2. A switch according to claim 1, wherein light is transmitted to and from aligned aperture pairs via optical fibres.

3. A switch according to claim 1, wherein the other aligned aperture pairs in the particular switch position respectively transmit light among optically-interfaced nodes of a system.

4. A switch according to claim 3, wherein the switch is enclosed in a cabinet having a frame with a stack of drawers each housing a node of the system.

5. A switch according to claim 4, wherein the drawers are electromagnetically shielded from one another to prevent or minimize crosstalk between the nodes.

6. A switch according to claim 3, further comprising the system, wherein the system is selected from an information system, a communication system, a control system, and combinations thereof.

7. A switch according to claim 1, further including a manual position selector operatively connected to a servo motor to electromechanically actuate the movable plate to selectively occupy the switch positions.

8. A switch according to claim 7, wherein the manual position selector has manually selectable positions corresponding to the internal switch positions and the external switch position indicating windows.

9. A switch according to claim 7, wherein three or more pairs of apertures are aligned in each switch position, and wherein light transmitted through a second selected aligned aperture pair in a particular switch position provides a feedback control signal to the servo motor that the movable plate is positively registered in the particular switch position.

10. A switch according to claim 9, wherein four or more pairs of apertures are aligned in each switch position, and wherein light transmitted through a third selected aligned aperture pair in a particular switch position allows monitoring or logging of the particular switch position.

11. A switch according to claim 10, wherein the apertured plates are rectilinear or circular, and the movement of one of the apertured plates relative to the other is one of a linear movement or a rotary movement respectively.

12. A switch according to claim 1, wherein the apertured plates are disposed closely adjacent each other prevent optical leakage from aligned aperture pairs.

13. A switch according claim 1, further comprising a security housing, wherein a switch is enclosed in a security housing which prevents or resists tampering with its optomechanical components.

* * * * *

UNITED STATES PATENT AND TRADEMARK OFFICE
CERTIFICATE OF CORRECTION

| | | |
|---|---|---|
| PATENT NO. | : 8,189,969 B2 | Page 1 of 1 |
| APPLICATION NO. | : 11/988637 | |
| DATED | : May 29, 2012 | |
| INVENTOR(S) | : Charles Anthony Ashcroft et al. | |

It is certified that error appears in the above-identified patent and that said Letters Patent is hereby corrected as shown below:

In claim 1, Col. 3, lines 47 and 48 should read:

--1.  A switch having two plates, each plate having one or more apertures, one plate being movable relative to the--

Signed and Sealed this
Eleventh Day of September, 2012

David J. Kappos
*Director of the United States Patent and Trademark Office*